(12) United States Patent
Bhattacharjee et al.

(10) Patent No.: US 8,161,241 B2
(45) Date of Patent: Apr. 17, 2012

(54) TEMPERATURE-AWARE BUFFERED CACHING FOR SOLID STATE STORAGE

(75) Inventors: Bishwaranjan Bhattacharjee, Hawthorne, NY (US); Mustafa Canim, Dallas, TX (US); Christian A. Lang, Hawthorne, NY (US); George A. Mihaila, Hawthorne, NY (US); Kenneth A. Ross, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/686,022

(22) Filed: Jan. 12, 2010

(65) Prior Publication Data

US 2011/0173395 A1 Jul. 14, 2011

(51) Int. Cl.
*G06F 12/08* (2006.01)
(52) U.S. Cl. .................. 711/118; 711/112; 711/135
(58) Field of Classification Search .................. None
See application file for complete search history.

(56) References Cited

U.S. PATENT DOCUMENTS

| | | | | |
|---|---|---|---|---|
| 6,324,620 | B1* | 11/2001 | Christenson et al. | 711/112 |
| 7,363,453 | B1* | 4/2008 | Arnan et al. | 711/170 |
| 7,496,711 | B2* | 2/2009 | Bartley et al. | 711/117 |
| 2005/0050279 | A1* | 3/2005 | Chiu et al. | 711/137 |
| 2008/0005475 | A1* | 1/2008 | Lubbers et al. | 711/118 |
| 2008/0133456 | A1 | 6/2008 | Richards et al. | |
| 2008/0144128 | A1* | 6/2008 | Bhattacharjee et al. | 358/474 |
| 2009/0012979 | A1 | 1/2009 | Bateni et al. | |
| 2009/0198883 | A1* | 8/2009 | Fortin et al. | 711/112 |
| 2010/0017591 | A1* | 1/2010 | Smith et al. | 713/2 |
| 2010/0281230 | A1* | 11/2010 | Rabii et al. | 711/165 |

OTHER PUBLICATIONS

Jiang, S., et al. Coordinated Multilevel Buffer Cache Management With Consistent Access Locality Quantification. IEEE Transactions on Computers. vol. 56, No. 1. Jan. 2007. pp. 95-108.

Koltsidas, I., et al. The Case for Flash-Aware Multi-Level Caching. The University of Edinburgh: School of Informatics. 2009. pp. 1-12. http://homepages.inted.ac.uk/s0679010/mfcache-TR.pdf.

Koltsidas, I., et al. Utility-Aware Multi-Device Caching. The University of Edinburgh: School of Informatics. 2009. (22 Pages) http://homepages.inted.ac.uk/s0679010/multi-dev-cache-TR.pdf.

Megiddo, N., et al. Arc: A Self-Tuning, Low Overhead Replacement Cache. USENIX File & Storage Technologies Conference (FAST). Mar. 2003. (16 Pages).

Mrosseter. Teradata Virtual Storage: The New Way to Manage Multi-Temperature Data. Teradata Developer Exchange. Aug. 2009. (6 Pages) http://developer.teradata.com/database/articles/teradata-virtual-storage-the-new-way-to-manage-multi-temperature-data.

Oracle Corporation. Sun Oracle Database Machine: Frequently Asked Questions. 2009. (3 Pages) http://www.oracle.com/database/docs/sun-oracle-database-machine-faq.pdf.

(Continued)

*Primary Examiner* — Kaushikkumar Patel
(74) *Attorney, Agent, or Firm* — Tutunjian & Bitetto, P.C.; Preston J. Young, Esq.

(57) ABSTRACT

A system and method for managing a cache includes monitoring a temperature of regions on a secondary storage based on a cumulative cost to access pages from each region of the secondary storage. Similar temperature pages are grouped in logical blocks. Data is written to a cache in a logical block granularity by overwriting cooler blocks with hotter blocks.

25 Claims, 5 Drawing Sheets

OTHER PUBLICATIONS

Wikimedia Foundation, Inc. Hierarichal Storage Management. Wikipedia. Dec. 2009. (3 Pages) http://en.wikipedia.org/wiki/Hierarchical_storage_management.

Zhou, Y., et al. Second-Level Buffer Cache Management. IEEE Transactions on Parallel and Distributed Systems. vol. 15, No. 7. Jul. 2004. pp. 1-15.

* cited by examiner

TEMPERATURE-AWARE BUFFERED CACHING FOR SOLID STATE STORAGE

BACKGROUND

1. Technical Field

The present invention relates to memory storage systems and methods and more particularly to temperature based memory hierarchy caching.

2. Description of the Related Art

Solid state devices (SSDs) provide much faster random access to data compared to conventional hard disk drives (HDD). Therefore, the response time of a database engine could be improved dramatically by exploiting the useful characteristics of SSDs.

Conventional replacement algorithms used by memory buffer pools are not adequate for an SSD. SSDs have a random write penalty for small fragments which is not considered by well known replacement algorithms. Current replacement algorithms also do not consider long-term statistics about the access frequency and method (random/sequential) of individual pages or regions.

SSDs store data persistently using NAND flash memory. While SSDs are more expensive than hard disks when measured in dollars per gigabyte, they are significantly cheaper when measured in dollars per random input/output (I/O) per second. For workloads with significant random I/O, there is an opportunity to add SSDs to the configuration. The use of these SSDs should be targeted to the portion of the workload that can benefit the most from random I/O savings. Using SSDs to store an entire enterprise-scale database is not currently cost-effective.

Transaction processing is an application in which random I/O may play a relatively significant role. Small update transactions may touch records that are widely distributed across a physical storage medium. Placement of certain tables and/or indexes selectively on an SSD may be studied to take maximal advantage of the SSD's performance advantages. A workload is profiled to determine which tables and indexes generate the most physical random I/O, and tables are placed on the SSD in order of decreasing I/O per page.

There are a few drawbacks to such an approach. First, a user must explicitly run a profiling tool to gather statistics, and then perform potentially expensive physical reorganizations as data is moved to/from the SSD. Second, decisions are made at the granularity of an entire table or index. In some cases, only part of the data in a table (e.g., the most recent data) may be frequently accessed, and one might hope to put just fragments of the table on the SSD.

SUMMARY

A system and method for managing a cache includes monitoring a temperature of regions on a secondary storage. The temperature is defined as the cumulative cost to access pages from each region of the secondary storage. Pages of similar temperature are grouped within logical blocks. Data is written to a cache in a logical block granularity by overwriting cooler blocks with hotter blocks.

Another method for managing a cache includes dividing space of a memory system into regions, the memory system including at least one solid state storage device which functions as a cache. A temperature of the regions is monitored on a secondary storage based on a cumulative cost to access pages from each region of the secondary storage. Pages are grouped with similar temperature in logical blocks. Data is written to the cache in a logical block granularity by overwriting cooler blocks with hotter blocks.

A memory management system includes at least one solid state device separated into regions, at least one secondary storage device separated into regions and coupled to the at least one solid state device such that data is exchanged therebetween. A memory management program is configured in software on a memory storage medium. The memory management program is configured to monitor a temperature of the regions on the secondary storage device based on a cumulative cost to: access pages from each region of the secondary storage using a temperature counter, group pages with similar temperature into logical blocks and write data to the at least one solid state device cache with a granularity of a logical block size by overwriting cooler blocks with hotter blocks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
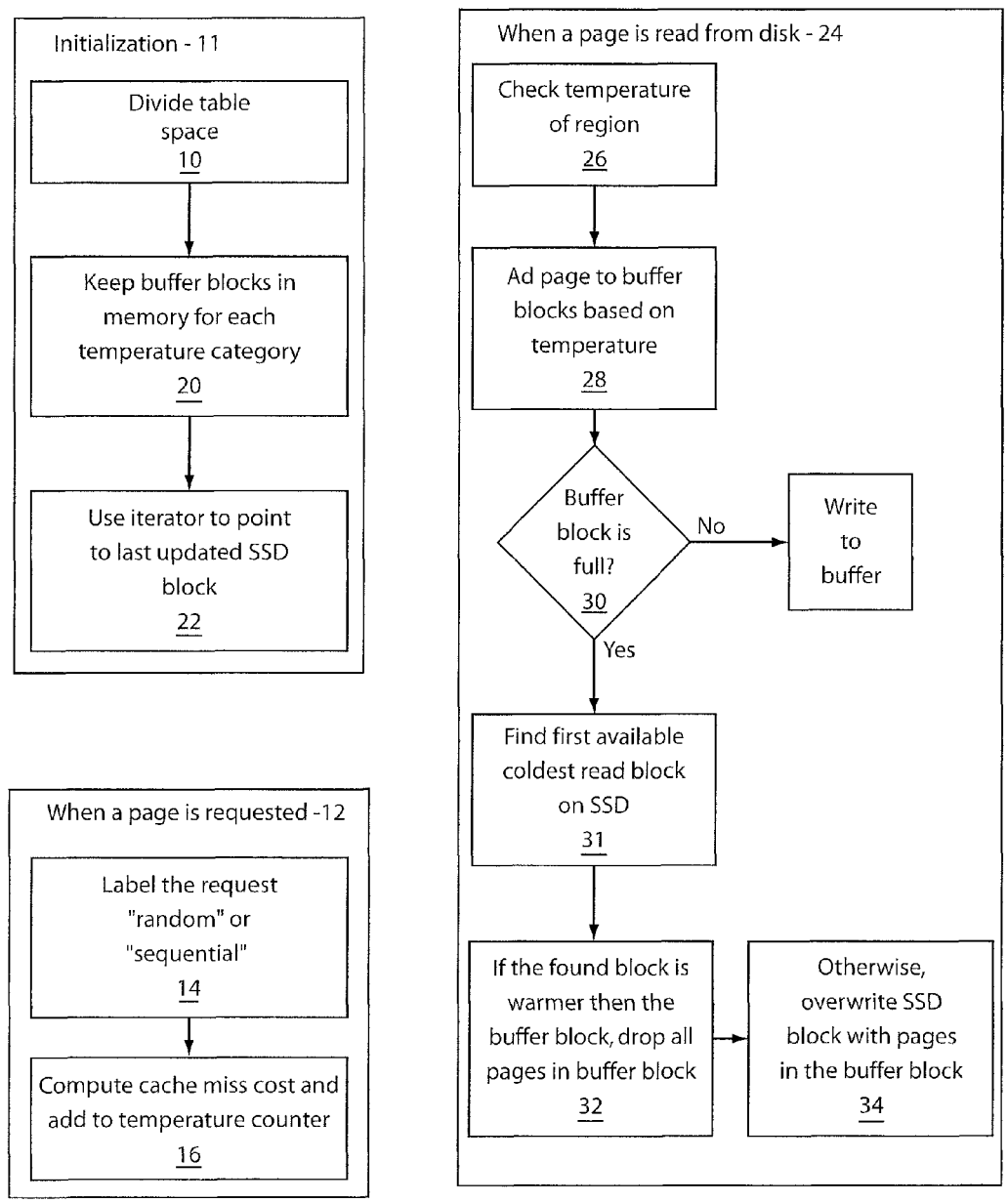
FIGS. 1A and 1B are portions of a block/flow diagram showing an illustrative system/method for managing a memory system employing solid state elements in accordance with one embodiment.

In accordance with the present principles, techniques for using solid-state storage as an extension of main memory in database management systems is disclosed. With these techniques the cost of flushing dirty pages in a random order to the disk is eliminated, and random disk accesses for read requests are prevented as much as possible. This is achieved by continuously monitoring disk access patterns to identify "hot" regions of the disk. With an adaptive mechanism, the regions that are getting colder over time are replaced with hotter regions to get maximum performance from the SSD. Using realistic work-loads (e.g., transaction processing performance council (TPC) workloads TPC-H and TPC-C), experimental confirmation that with a relatively small SSD space used the response time of the system is increased dramatically. A page is a smallest transfer unit between a secondary storage and a main memory as defined by, e.g., a database administrator. Typical sizes may be 4 KB, 8 KB, 16 KB, 32 KB, etc. A region is a set of $N_{region}$ consecutive pages on a hard disk drive, aligned at an $N_{region}$ page's boundary.

Rather than treating disk and SSD storage as alternative storage options at the same level of the memory hierarchy, we treat the SSD and disk hierarchically. All data is initially stored on the disk. Over time, high-value data is identified and stored in the SSD. This high-value data is current on the SSD, but not on the disk. Other low-value data is current on the disk, and not resident on the SSD. Thus, the SSD behaves like a write-back cache without inclusion guarantees. As with traditional caches, one needs to define suitable admission and replacement policies to optimize performance.

Database systems employ memory resident buffer pools that can hold a few gigabytes of data. If the application's working set fits within this memory budget, then there will be relatively little physical I/O and the benefits of an SSD cache may be minimal. There is a complementary risk that even if the application's working set exceeds the buffer pool size, the physical I/O may be spread thinly over a very broad range of pages, meaning that there would be little locality for a cache to utilize.

Despite those risks, an analysis of real workloads has shown that significant opportunities for performance improvement using an SSD cache are available. We have profiled DB2 running on a TPC-C workload, and have recorded the traces of physical I/O requests. These traces reveal that there remains substantial locality of reference in the physical I/O stream. For the identified locality, if accesses are grouped into contiguous fixed-size regions of physical memory, there are "warm" and "cold" regions. Warm regions correspond to tables (or contiguous parts of tables) that are accessed moderately often, but whose active size is too big to fit into the buffer pool. Cold regions correspond to tables that are either infrequently accessed, or to tables that are so big that the per-region access frequency is low.

Based on these observations, it appears that gathering region-based data on-line could be helpful to determine which regions are warm and which are cold. Based on this information, one can define suitable admission control and eviction policies for the SSD cache. Region-based data has advantages over page-level statistics. First, keeping statistics for every page in the database would take much more space. Second, page-level statistics would be more sparse, and if used alone would not capture the information that accesses to neighboring pages increase the chance of reuse for a given page.

Traditional caches admit every page, and accumulate data about use over time, such as frequency of access or time of last access. Pages are candidates for eviction if they are accessed rarely (low frequency) or long ago (old time of last access). Information about the reuse potential of a page is gathered only after the page is admitted, and it may take time for the system to evict a cold page. For example, under a least recently used (LRU) policy, a newly admitted page that is never reused will not be replaced until after at least N more page accesses, where N is the capacity of the cache. Cold pages will therefore pollute the cache, and lead to a smaller effective cache size.

In the present approach, we gather region-level statistics on the fly. A page is admitted if it comes from a warm region. A page from a cold region may be admitted, but only if it does not displace a page from a warm region. Region statistics are maintained on-line, and updated for each page access, whether the access resulted in the admission of the page or not. As a result, the system can adapt to changes in page access patterns over time. By refusing to admit pages from cold regions at the expense of pages from warm regions, more of the cache is available for warm-region pages, leading to improved cache performance. Using techniques that are well-known in the art, region statistics can be aged so that recent data on access frequency has higher weight than historical data.

This approach overcomes at least two drawbacks. First, because all data gathering is on-line and automatic, no explicit tuning or physical reorganization is needed. Secondly, decisions are made at a region level, which is finer than the whole table level. Thus, if only part of a table is warm, such as the most recently appended data, only that part of the table will be cached.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1B:
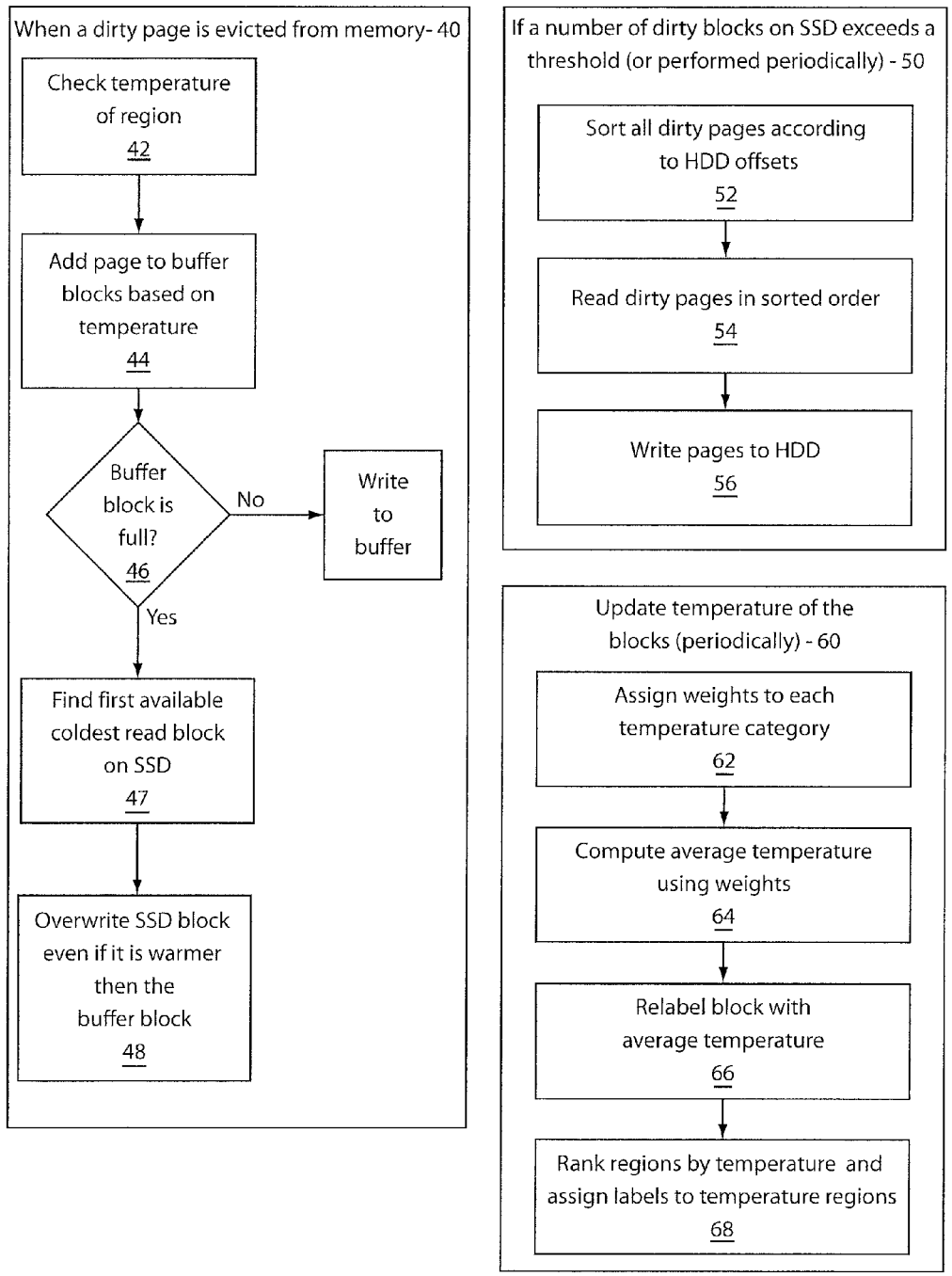

Referring now to the drawings in which like numerals represent the same or similar elements and initially to FIGS. 1A and 1B, referred to hereinafter as FIG. 1, a system/method for maintaining a memory system is illustratively described in accordance with one illustrative embodiment. It should be recognized that compound statement blocks 11, 12, 24, 40, 50 and 60 may be performed in any order. These compound blocks may be executed upon achieving the stated condition, executed periodically or executed when a threshold is reached. Block 11, includes initialization steps and may be performed in conjuction with other compound blocks (e.g., block 60). The initialization block 11 may be run initially or periodically as needed. In block 10, divide table space of a memory system into logical regions. For each logical region, keep a temperature counter. In block 20, for each temperature category keep buffer blocks in the memory. A buffer block is a main memory container capable of holding $N_{block}$ pages. In block 22, use an iterator which points to the last updated SSD block (based on, e.g., fairness or other criteria). A block is a set of $N_{block}$ pages stored contiguously on SSD, aligned at $N_{block}$ page boundaries.

In compound block 12, when a page request is issued, perform the following. In block 14, label the request as either "Random" or "Sequential" using a window-based approach (if a region is accessed more than a given number of times within a time window, the access is assumed to be "Sequential", otherwise it is labeled "Random"). In block 16, compute a cache miss cost for the particular page request and add it to the temperature counter of that region. The regions can be ranked by temperature as described in block 68.

In compound block 24, when a page is read from disk, perform the following. In block 26, check the temperature of the region from where the page is read, and add the page to one of the buffer blocks based on its temperature in block 28. In block 30, if the buffer block is full, then find the first available coldest read block on the SSD in block 31. In block 32, if the found block is warmer than the buffer block, drop all pages from the buffer block without writing to SSD. Otherwise, overwrite the SSD block with the pages in the buffer block in block 34.

In compound block 40, when a dirty page is evicted from the memory, check the temperature of the region where the page is requested to be written in block 42, and add the dirty page to one of the buffer blocks based on its temperature in block 44. In block 46, if the buffer block is full, then find the first available coldest read block on the SSD in block 47 and overwrite the SSD block even if it is warmer than the buffer block in block 48.

In compound block 50, if the number of dirty blocks on SSD exceeds a certain threshold or upon elapsing of a period, then sort all of the dirty pages on the SSD according to their HDD offsets in block 52, start reading these pages from SSD in the sorted order in block 54 and write these pages to the HDD in block 56.

In compound block 60, update the temperature of the blocks on SSD periodically by assigning weights to each temperature category in block 62, using these weights compute the average temperature of the block in block 64 and relabel the block according to its average block temperature in block 66. By periodically discounting the temperature of all regions, e.g., based on aging, more weight is given to recent activity. In block 68, rank the regions according to their temperatures and assign temperature labels to each region (e.g., very hot, hot, cold, very cold) according to their ranking.

In accordance with particularly useful embodiments, the present principles can be implemented as a layer within database programs and systems (e.g., DB2) to manage page replacement on SSD automatically, and reduce dependency on database performance tuning. A more detailed explanation of FIG. 1 will now be described.

Region-based Temperature Detection: The disk space is divided into logical regions so as to gather temperature information. Although there is not a strict restriction on determining the size of a region, choosing a reasonable region size plays a role on cost performance trade off. If the region size is chosen as small as a page, the memory requirement to store the temperature information would be very costly. On the other extreme, if the region size is chosen to be very large (e.g., as large as the objects such as tables or indexes), the collected information will not be very predictive as there would be high skew in the temperature distribution in smaller granularities. In our experiments, we chose the region size as large as an extent (32 pages).

Each page request issued by the buffer pool layer contributes to the computation of regional temperatures. First, the access patterns of the page requests are determined using a window technique. As the pages are requested, the consecutive page IDs are accumulated within a logical window. Once the window is full the page IDs are transformed into region IDs. If a region is accessed more than a certain threshold value within a window, these page requests are labeled as "sequential". Otherwise, the page request is labeled as "random". After labeling each page request, the corresponding regional statistics are updated using the following function.

$$C(P_i) = \begin{cases} \Delta S = S_{HDD} - R_{SSD} & \text{if } P_i \text{ is sequentially accessed} \\ \Delta R = R_{HDD} - S_{SSD} & \text{if } P_i \text{ is randomly accessed} \end{cases} \quad (1)$$

In this function $S_{HDD}$ and $R_{HDD}$ are the times the hard disk takes to perform a sequential read and a random read respectively. $R_{SSD}$ is the time of performing a random read on SSD. Consequently, $\Delta S$ is the extra time cost incurred if the requested page $P_i$ has not been found on SSD and retrieved from the hard disk in a sequential manner. Similarly, $\Delta R$ is the extra time cost of retrieving the page $P_i$ from the disk in a random fashion if the page does not exist on SSD. For each page request, $C(P_i)$ is computed and added to the incremental cost of the corresponding region. Over time, one can see which regions of the disk incurs the highest I/O cost. These cumulative values are then used to determine the temperatures of the regions while making the decision of page replacement. The pages that are evicted from the main memory buffer pool will have higher chance of being cached on SSD if the cumulative cost of the corresponding regions is relatively higher than others.

While collecting these regional statistics, the write operations are not considered. This is because the dirty pages sent to the file manager to be written to the disk are never written to the disk directly. Instead, all of the dirty pages are first buffered on the SSD cache without considering the temperature of the corresponding regions of dirty pages. Since the random disk accesses (random writes) are completely eliminated the dirty page requests are not considered while collecting regional temperature statistics. As the regional statistics are incrementally updated, the boundary values of the temperature categories are periodically updated. Later on, these values are used while making the decision of keeping or evicting pages from the SSD cache.

Eliminating Random Writes with a Buffering Mechanism: For each temperature level, different buffer blocks are kept in the main memory. Additionally for each temperature level two types of buffer blocks may be kept. These include a clean buffer block and a dirty buffer block. If there are four temperature levels, for example, "very hot", "hot", "cold", "very cold"}, eight buffer blocks are employed to buffer the pages waiting to be flushed to the $S_{BP}$, the buffer pool on SSD.

Page Replacement Method: How the pages are placed on SSD buffer pool and how we use the temperature information to selectively overwrite the pages will now be explained. Table 1 summarizes the notations used for describing the method steps as presented in pseudo-code hereinafter.

TABLE 1

Notations

| | |
|---|---|
| $M_{BP}$ | The buffer pool on main memory |
| $S_{BP}$ | The buffer pool on SSD |
| $H_{S_{BP}}$ | Hash table used to find the physical address of pages stored in $S_{BP}$ |
| $R_i$ | Region id of page $P_i$ |
| $T_i$ | Temperature of region $R_i$ |
| BBclean[j] | $j^{th}$ buffer block including clean pages waiting to be flushed from $M_{BP}$ |
| BBdirty[j] | $j^{th}$ buffer block including dirty pages waiting to be flushed from $M_{BP}$ |
| SBclean[k] | $k^{th}$ SSD block including clean pages |
| SBdirty[k] | $k^{th}$ SSD block including dirty pages |
| T(*) | Temperature of the block * |

Whenever a new page is needed to be accessed during query processing, a page request is issued to the main memory buffer pool, $M_{BP}$. In a conventional database engine, if the page does not exist in the main memory, the request is forwarded to a file manager to retrieve it from the disk. Since we use SSD as an extension of the main memory buffer pool, $S_{BP}$, the page request is first forwarded to the SSD buffer pool agent. If it is found in $S_{BP}$, the page is read from the SSD. Otherwise, the page is retrieved from the disk. Based on its temperature, a decision regarding the insertion of the page into $S_{BP}$ is made while the page is being forwarded to $M_{BP}$. The details of these operations are described in METHOD 1.

When a page $P_i$ is requested, the SSD buffer pool agent checks if the page is stored in $S_{BP}$ by probing a hash table, $H_{S_{BP}}$. This table keeps {page ID, page offset} pairs where page offset is the physical location of the pages stored on SSD, which is identified with page ID. If the key is found in the table, the page is retrieved from $S_{BP}$ to $M_{BP}$. Otherwise, the page is read from the disk and sent to $M_{BP}$. After reading from the disk, the region ID of the page, $R_i$, is determined using the page to region mapping function. Once the region of the page is known, the page is inserted to one of the buffer blocks according to its temperature information. If the buffer block gets full after inserting $P_i$ the flushing step is executed. These steps are shown in METHOD 2.

METHOD 1: Retrieving a missing page
to the main memory buffer pool

```
 1: Given a requested page P_i check H_{S_BP} for P_i
 2: if found then
 3:     read P_i from S_BP and send it to the M_BP
 4: else
 5:     read P_i from disk and send it to the M_BP
 6:     R_i ← find region of P_i
 7:     T_i ← get temperature level of R_i
 8:     add P_i to buffer block BBclean[T_i]
 9:     if BBclean[T_i] is full then
10:         flush BBclean[T_i]
11:     end if
12: end if
```

As mentioned, the updates on the SSD are made in the level of blocks so as to prevent the cost associated with random writes. Once a buffer block is full, the pages in the buffer block should be flushed. Flushing includes finding an available SSD block to overwrite. An iterator is used to keep the information of last overwritten SSD block. Starting from the last updated block, the iterator is advanced until finding the first coldest clean block, which we call a candidate block. The candidate block includes clean pages which belong to the colder regions. Therefore, keeping these pages on SSD does not provide significant performance benefit. All pages within the candidate block are replaced with the pages waiting in BBclean[$T_i$]. During this operation the pages being overwritten are removed from $H_{S_{BP}}$ while inserting new page IDs to $H_{S_{BP}}$. Once the operation is completed, the iterator is advanced for subsequent searches. In case that a candidate block cannot be found, the pages within BBclean[$T_i$] are removed from the memory.

---
METHOD 2: Flushing BBclean[$T_i$] to the $S_{BP}$
---

1: if the temperature of the coldest clean block on $S_{BP}$ is less than or equal to $T_i$ then
2:     SBclean[$\alpha$] ← Advance the iterator until finding the first coldest clean block on $S_{BP}$
3:     Flush all pages in BBclean[$T_i$] by overwriting the pages in SBclean[$\alpha$]
4:     Update $H_{S_{BP}}$ for removed and inserted pages
5:     Advance the iterator
6: else
7:     Drop all pages in BBclean[$T_i$] without flushing them to $S_{BP}$
8: end if Caching clean pages on $S_{BP}$ has been explained. How to process dirty pages that are ready to be flushed from the memory will now be explained. The clean pages are dropped from the buffer block BBclean[$T_i$] if a candidate block on $S_{BP}$ could not be found. This does not cause any integrity problem as the latest version of the pages are already stored on the disk. However, if a buffer block full of dirty pages is dropped all updates performed on the pages will be lost. Therefore, all dirty pages should be flushed to the disk eventually, otherwise the SSD will at some point become full with dirty blocks and stop accepting new blocks. These steps are described in METHOD 3.

---
METHOD 3: Flushing dirty pages from main memory buffer pool
---

1: Given a dirty page $P_i$
2: $R_i$ ← find region of $P_i$
3: $T_i$ ← get temperature level of $R_i$
4: add $P_i$ to buffer block BBdirty[$T_i$]
5: if BBdirty[$T_i$] is full then
6:     flush BBdirty[$T_i$] to $S_{BP}$
7: end if During query processing, if the memory buffer pool gets full, the page cleaners start evicting dirty pages from the memory buffer pool. Suppose that a dirty page $P_i$ is ready to be flushed from $M_{BP}$ to a persistent storage device (i.e., either $S_{BP}$ or disk). First, the region ID of the page, $R_i$, is determined using the page to region mapping function. Once the region of the page is known, the page is inserted to one of the buffer blocks according to its temperature information. Note that for each temperature level two buffer blocks are used. One of them keeps the clean pages while the other is used to accumulated dirty pages. If the buffer block gets full after inserting $P_i$, the flushing step of METHOD 4 is executed.

Similar to METHOD 2, the first step of flushing dirty pages consists of finding an available SSD block to overwrite, which is referred to as a candidate block. A major distinction is that even though the temperature of the candidate block is warmer than BBdirty[$T_i$], the pages in candidate block are replaced with the pages in BBdirty[$T_i$]. An alternative approach would be to flush these pages to the disk in case that a candidate block on SSD was not found. We have observed that rather than flushing the dirty pages to the disk, accumulating these pages on $S_{BP}$ first and flushing them to the disk in sequential fashion provides dramatic performance improvements.

As the clean pages on $S_{BP}$ are replaced with dirty pages over time, there will be no space available on $S_{BP}$ to flush the buffer blocks. To prevent this, a threshold approach is performed. If the number of dirty pages on $S_{BP}$ exceeds a certain limit (a threshold), the dirty pages are flushed to the disk with an efficient method. This is described in METHOD 5.

---
METHOD 4: Flushing BBdirty[$T_i$] to the $S_{BP}$
---

1: SBclean [$\alpha$] ← Advance the iterator until finding the first coldest clean block on $S_{BP}$
2: Flush all pages in BBdirty[$T_i$] by overwriting the pages in SBclean[$\alpha$]
3: Update $H_{S_{BP}}$ for removed and inserted pages
4: Advance the iterator
5: if total number of dirty blocks on $S_{BP}$ exceeds allowed threshold then
6:     Flush dirty blocks from $S_{BP}$ to disk
7: end if Once we have enough dirty pages accumulated on $S_{BP}$, the flushing step is initiated. First, all dirty pages are sorted according to their physical disk offset values. Then, each dirty page $P_i$ in the sorted list is read from $S_{BP}$ and written to the disk. Note that the physical location of the pages read could be any arbitrary location on SSD. However, the physical location on the disk will be consecutive since the pages are sorted according to their physical disk offset values. Since a performance benefit of SSD devices comes from the random read performance, the random read performance of the SSD is used to compensate the performance penalty of random disk accesses. This in turn yields dramatic performance improvements.

Once the dirty pages are flushed to the disk all SSD buffer blocks are designated as clean blocks. Now all of these SSD blocks will be available to be overwritten by incoming pages.

---
METHOD 5: Flush dirty blocks from $S_{BP}$ to disk
---

1: Sort all dirty pages in $H_{S_{BP}}$ according to their physical disk offset values
2: for For each dirty $P_i$ in the sorted list do
3:     Write $P_i$ to the disk
4: end for
5: Convert dirty flags of all blocks on $S_{BP}$ to clean As discussed, $S_{BP}$ is used for two different purposes to improve the query execution performance. The first goal is to reduce the retrieval cost of pages to the $M_{BP}$ by keeping the pages of the hot regions on $S_{BP}$. A second goal is to eliminate the cost incurred by flushing the dirty pages to the disk in random order. Note that the second goal may conflict with the first goal in the following circumstances: When a dirty page $P_i$ belonging to a very cold region is evicted from $M_{BP}$, $P_i$ is first written to $S_{BP}$ even though a colder page on $S_{BP}$ is not found. Therefore, the method always executes the steps of the second goal when a conflict is faced.

Figure 2:
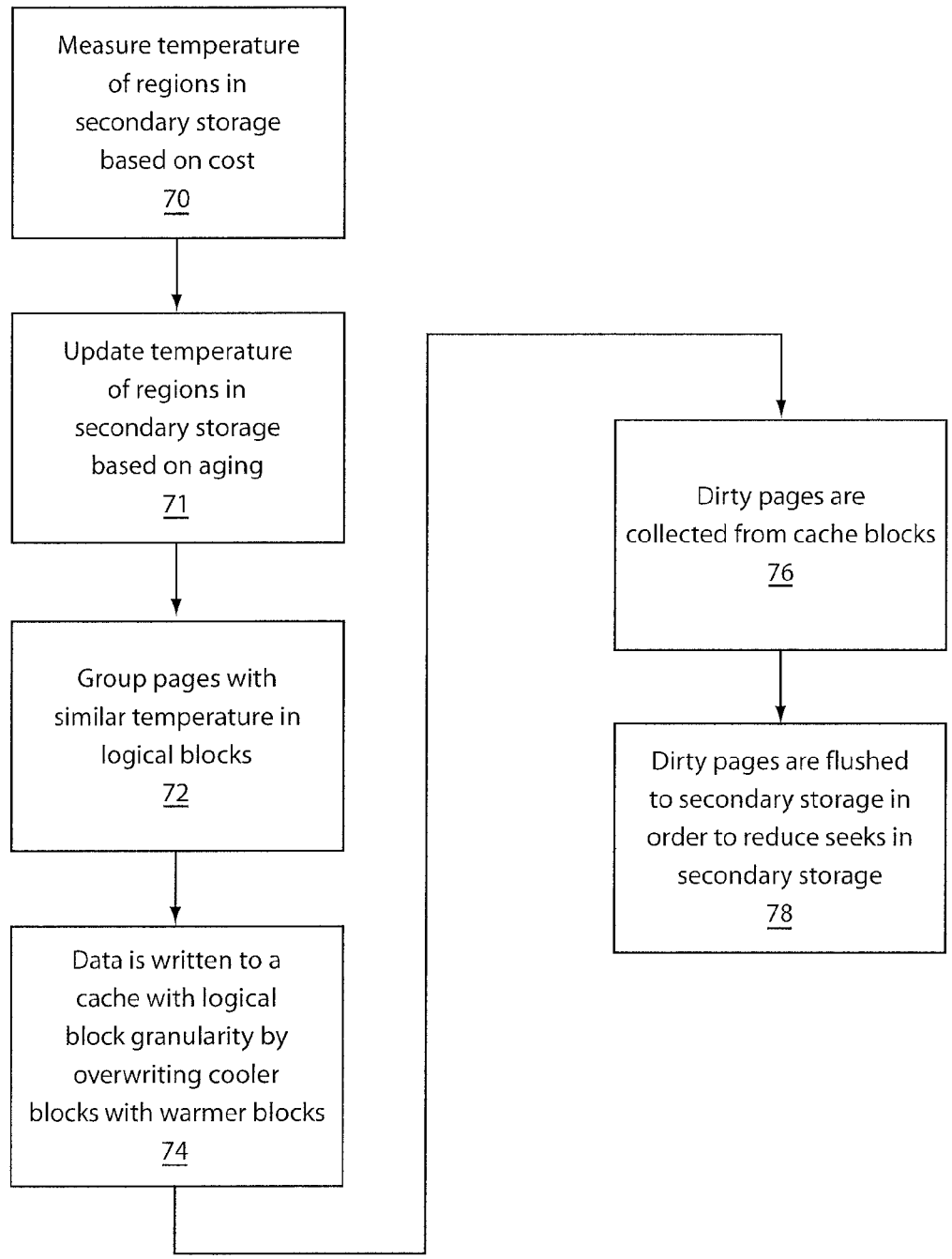
FIG. 2 is a block/flow diagram showing a more general illustrative system/method for managing a memory system in accordance with another embodiment.

Referring to FIG. 2, a block/flow diagram for a system/method for managing memory, in particular a cache memory, is illustratively shown. In block 70, a temperature of regions on a secondary storage is measured based on a cumulative cost to access pages from each region of the secondary storage device. In block 71, the temperature is periodically discounted for all regions (aging) to give more weight to recent activity. A discrete set of temperature values is employed. The discrete set of temperature values is a function of a ratio between a size of the secondary storage and a cache size.

In block 72, pages are grouped with similar temperature in logical blocks. A size of the logical block is decided according to write throughput characteristics of a memory device holding the cache. A logical block is a set of $N_{block}$ pages grouped in a contiguous memory container. $N_{block}$ is a fixed number of pages. In block 74, data is written to a cache in a logical block granularity by overwriting cooler blocks with hotter blocks. Writing data includes employing an iterator to keep track of a last replaced block based on fairness. In block 76, dirty pages are collected from cache blocks. In block 78, the dirty pages are flushed to the secondary storage in an order that reduces seeks on the secondary storage.

Figure 3:
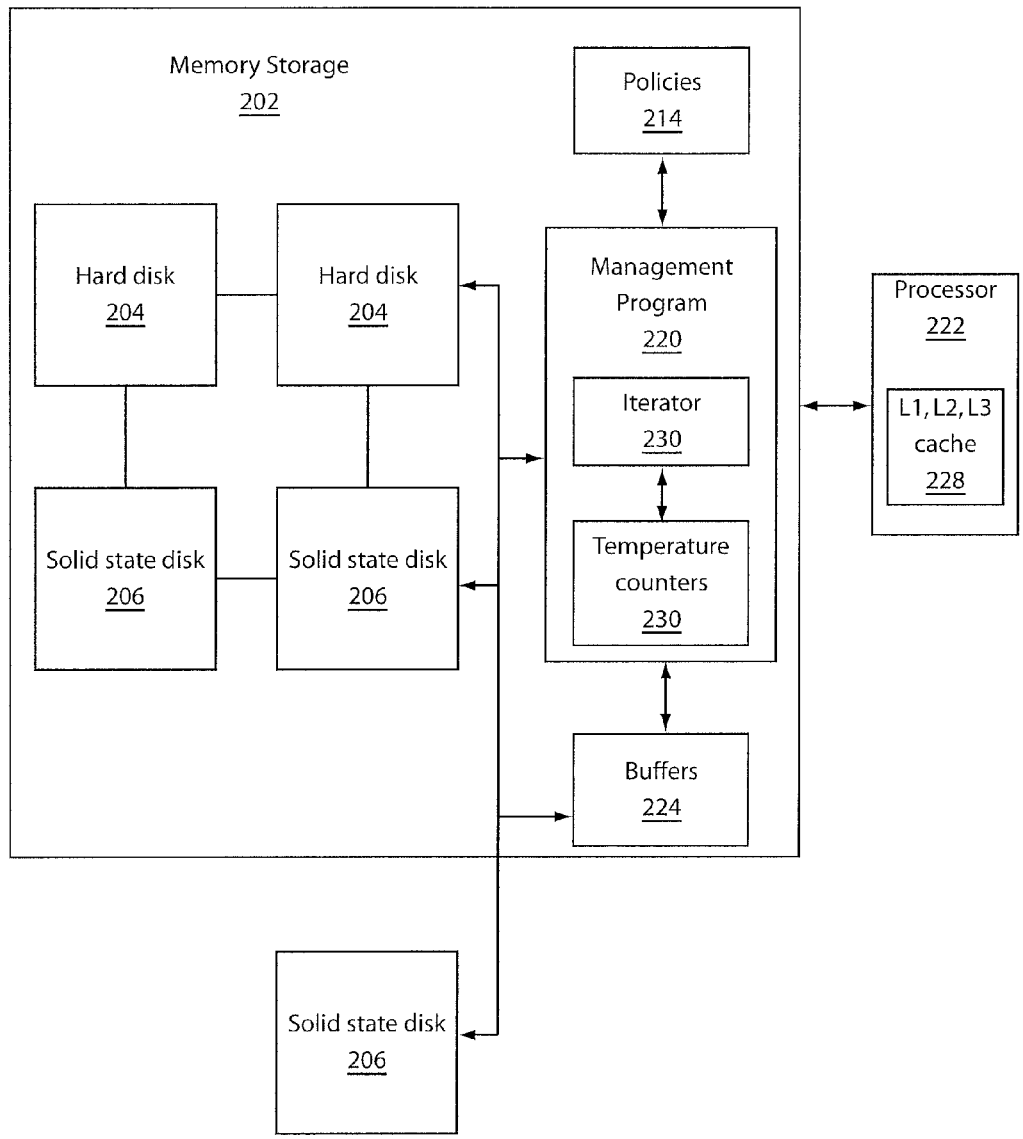
FIG. 3 is a block/flow diagram showing a system for managing memory in accordance with an illustrative embodiment.

Referring to FIG. 3, a memory system 200 includes memory storage 202. Storage 202 may include a plurality of different memory devices, arrays of devices, disks etc. These devices may be hierarchically arranged without regard to the type of memory device employed. This is due to the present principles, which provide a new way in which to arrange memory. In a particularly useful embodiment, the hierarchical memory includes solid state devices (SSDs). For illustrative purposes, memory storage 202 will be referred to as secondary storage 202. Secondary storage 202 may include buffers 224, solid state devices 206, external devices (e.g., solid state device 206'), hard disk drives 204, etc. The secondary storage 202 may be divided into regions based upon one or more criteria. In one example, the criteria may include cost per access, cost per unit of memory, latency time, cache miss cost, etc. In a particularly useful embodiment, regions may be assigned temperature. Temperature is measured based on the activity, e.g., a number of accesses, costs, etc. The regions are ranked by the temperature. Temperature is measured based upon a temperature counter 230. Temperature counters are assigned to each region. Each temperature category preferably includes buffer blocks for that category type.

Management tasks for managing the memory system 200 are provided by a management program 220. The program 220 may include an iterator 230 to point to a last undated block on a memory device. The secondary storage 202 works with one or more processing devices 222, which in turn preferably include a cache (primary storage) 228. The cache 228 may be hierarchy arranged (level 1, (L1), level 2 (L2), level 3 (L3), etc.). Management program 220 employs replacement policies 214 to designate and maintain regions of similarly accessed data at multiple levels in the secondary storage hierarchy. This is achieved through the measurement and updating of temperatures of the designated regions.

Figure 4:
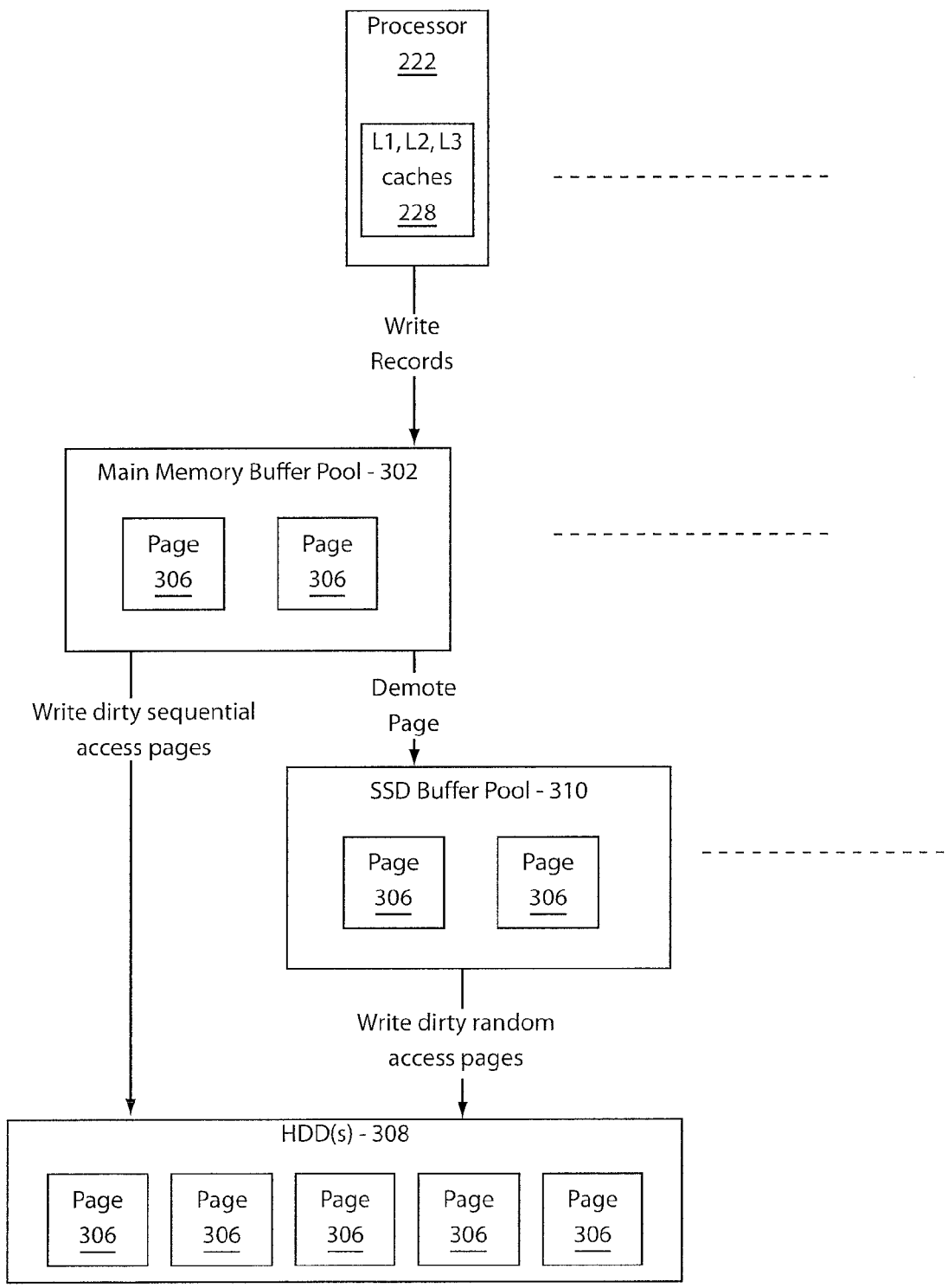
FIG. 4 is a block diagram showing an illustrative system architecture which combines solid state devices and hard drive disks for managing memory in accordance with an illustrative embodiment.

Referring to FIG. 4, an illustrative architecture is depicted which advantageously employs a solid state device (SSD) 308 as an intermediate cache to extend a buffer pool to reap the high performance (faster) aspects of the SSD. A processor 222 includes a primary cache 228 in proximity or integrated with the processor 222. The processor 222 and/or the primary cache writes records or pages 306 to a buffer pool 302 for main memory. The main memory buffer pool 302 includes pages 306. Based upon temperature criteria explained above, the main memory buffer pool 302 may demote a page to a SSD buffer pool 308 or write dirty sequential access pages to a hard disk drive (HDD) 310. The SSD buffer pool 308 writes dirty random access pages to the HDD 310. The program 220 (FIG. 3) enforces replacement policies to seamlessly integrate an intermediate cache using the SSD 308. Further, the temperature policies are enforced across the secondary storage to permit seamless interaction between different memory devices. Thus, a clean block on the SSD can be overwritten with either a warmer clean block or with a dirty block until a certain dirty percentage threshold has been reached.

Having described preferred embodiments of a system and method for temperature-aware buffered caching for solid state storage (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing memory, comprising:
monitoring temperature of regions in secondary storage based on a cumulative cost to access pages from each region of the secondary storage;
grouping similar temperature pages in logical blocks; and
writing data to a cache in a logical block granularity by overwriting cooler blocks with hotter blocks.

2. The method as recited in claim 1, further comprising:
collecting dirty pages from cache blocks; and
flushing the dirty pages to the secondary storage in an order that reduces seeks on the secondary storage.

3. The method as recited in claim 1, wherein a size of the logical block is decided according to characteristics of a memory device holding the cache.

4. The method as recited in claim 1, wherein writing data includes employing an iterator to keep track of a last replaced block based on fairness.

5. The method as recited in claim 1, wherein monitoring temperature includes periodically discounting the temperature of all regions to give more weight to recent activity.

6. The method as recited in claim 1, wherein monitoring temperature includes employing a discrete set of temperature values.

7. The method as recited in claim 6, wherein the discrete set of temperature values is a function of a ratio between a size of the secondary storage and a cache size.

8. The method as recited in claim 1, wherein the secondary storage device includes a solid state storage device.

9. A method for managing a cache, comprising:
dividing space of a secondary storage of a memory system into regions, the memory system further including at least one solid state storage device which functions as a cache;
monitoring a temperature of the regions on the secondary storage based on a cumulative cost to access pages from each region of the secondary storage;
grouping pages with similar temperature in logical blocks; and
writing data to the cache in a logical block granularity by overwriting cooler blocks with hotter blocks.

10. The method as recited in claim 9, wherein monitoring includes labeling requests as random or sequential using a window-based approach to compute a cache miss cost for a particular page request; and adding the cost to a temperature counter of that region.

11. The method as recited in claim 9, wherein grouping pages with similar temperature includes ranking the regions according to their temperatures; and assigning temperature labels to each region according to their ranking.

12. The method as recited in claim 9, further comprising, when a page is read from disk, checking the temperature of the region from where the page is read; and adding the page to a buffer block based on its temperature.

13. The method as recited in claim 12, further comprising, if the buffer block is full then finding a first available coldest read block on the cache.

14. The method as recited in claim 12, further comprising, if a found block is warmer than the buffer block, dropping all pages from the buffer block without writing to the cache; otherwise, overwriting the cache block with the pages in the buffer block.

15. The method as recited in claim 9, further comprising:
collecting dirty pages from cache blocks; and
flushing the dirty pages to the secondary storage in an order that reduces seeks on the secondary storage.

16. The method as recited in claim 9, wherein a size of the logical block is decided according to characteristics of a memory device holding the cache.

17. The method as recited in claim 9, wherein writing data includes employing an iterator to keep track of a last replaced block based on fairness.

18. The method as recited in claim 9, wherein monitoring a temperature of regions includes periodically discounting the temperature of all regions to give more weight to recent activity.

19. The method as recited in claim 9, wherein monitoring a temperature of regions includes employing a discrete set of temperature values.

20. The method as recited in claim 19, wherein the discrete set of temperature values is a function of a ratio between a size of the secondary storage and a cache size.

21. A non-transitory computer readable storage medium comprising a computer readable program for managing a cache, wherein the computer readable program when executed on a computer causes the computer to perform:
monitoring temperature of regions on a secondary storage based on a cumulative cost to access pages from each region of the secondary storage;
grouping similar temperature pages in logical blocks; and
writing data to a cache in a logical block granularity by overwriting cooler blocks with hotter blocks.

22. A non-transitory computer readable storage medium comprising a computer readable program for managing a cache, wherein the computer readable program when executed on a computer causes the computer to perform:
dividing space of a secondary storage of a memory system into regions, the memory system further including at least one solid state device which functions as a cache;
monitoring a temperature of the regions on the secondary storage based on a cumulative cost to access pages from each region of the secondary storage;
grouping pages with similar temperature in logical blocks; and
writing data to the cache in a logical block granularity by overwriting cooler blocks with hotter blocks.

23. A memory management system, comprising:
at least one solid state device separated into logical blocks;
at least one secondary storage device separated into regions and coupled to the at least one solid state device such that data is exchanged therebetween;
a memory management program configured in software on a memory storage medium, the memory management program configured to monitor a temperature of the regions on the secondary storage device based on a cumulative cost to access pages from each region of the secondary storage using a temperature counter, group pages with similar temperature into the logical blocks and writing data to the at least one solid state device cache with a granularity of a logical block size by overwriting cooler blocks with hotter blocks.

24. The system as recited in claim 23, wherein a size of the logical block is decided according to write throughput characteristics of a memory device holding the solid state device and a discrete set of temperature values is a function of a ratio between a size of the secondary storage and a size of a cache provided using the at least one solid state storage device.

25. The system as recited in claim 23, wherein writing data includes employing an iterator to keep track of a last replaced block based on fairness.

* * * * *